United States Patent [19]
Burton

[11] 3,724,290
[45] Apr. 3, 1973

[54] ADJUSTABLE TILT STEERING DEVICE
[75] Inventor: Maurice G. Burton, Salt Lake City, Utah
[73] Assignee: Ute Liner, Inc., Salt Lake City, Utah
[22] Filed: Sept. 13, 1971
[21] Appl. No.: 179,925

[52] U.S. Cl. ................................................ 74/493
[51] Int. Cl. .............................................. B62d 1/18
[58] Field of Search .74/492, 493; 180/78; 280/87 A, 280/150 B

[56] References Cited

UNITED STATES PATENTS

| 2,185,779 | 1/1940 | Tveidt | 74/493 |
| 3,533,302 | 10/1970 | Hansen | 280/87 A X |

Primary Examiner—Milton Kaufman
Assistant Examiner—Frank H. McKenzie, Jr.
Attorney—Lawrence J. Winter

[57] ABSTRACT

An adjustable steering column pivotally connected to a vehicle and having a foot actuated release crank with the upper end of the crank rotatably extending through brackets. A flat release bar is fixed to the upper end of the crank and bears against vertical slidable release pins with the upper end of the pins bearing against two guide bars welded to a transverse bar. The gripping bar is fixed to the brackets and has bolt members extending therethrough with spring members thereon which urges the gripping bar against the bottom of a longitudinally extending tongue member. An upper fixed transverse bar is disposed on the upper ends of the bolts and bears against the top of the tongue so that the tongue is normally held immobile between the gripping and upper bar. Pressing down on the foot pedal causes the upper end of the crank to rotate in a counter-clockwise direction and causes the rear portion of the release bar to move downwardly and its front portion to move upwardly against the release pins. Since the pins cannot move upwardly and the gripping bar is fixed to the bracket it, too, moves downwardly against the springs compressing them and causing them to move away from the tongue so it can then be adjusted to another position at a different desired angle. Release of the foot pedal releases the springs and they again bear against the gripper bar and it, in turn, against the tongue to cause it to be immobile.

9 Claims, 5 Drawing Figures

PATENTED APR 3 1973 3,724,290
SHEET 1 OF 2
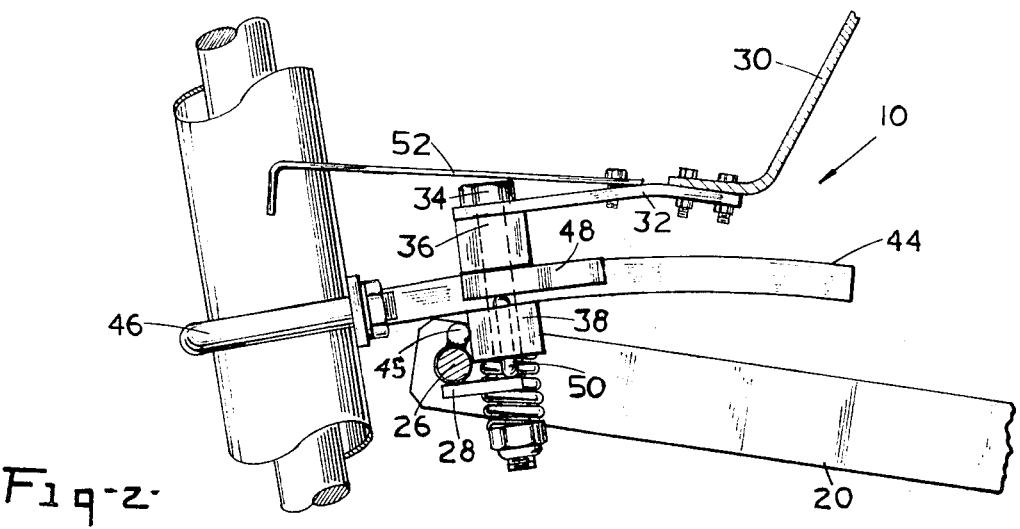
Fig-2-
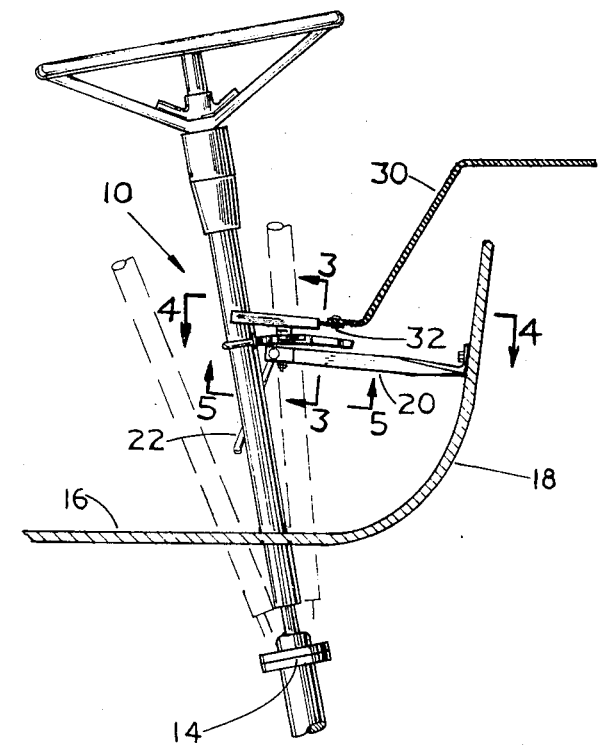
Fig-1-
INVENTOR:
MAURICE G. BURTON

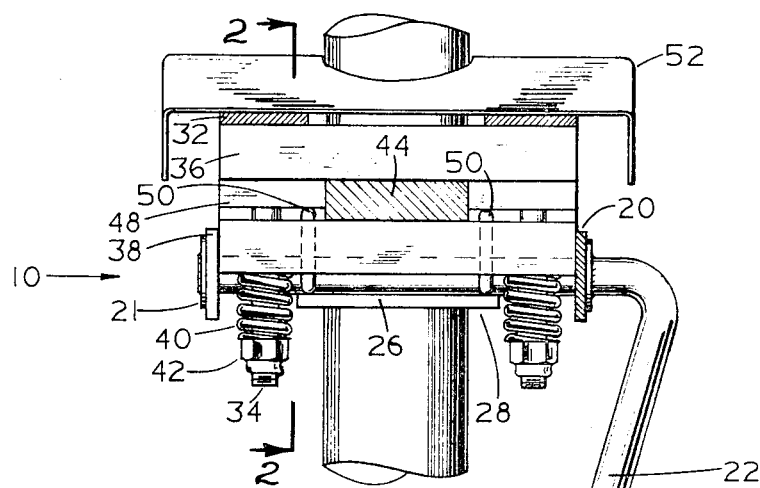
Fig-3-
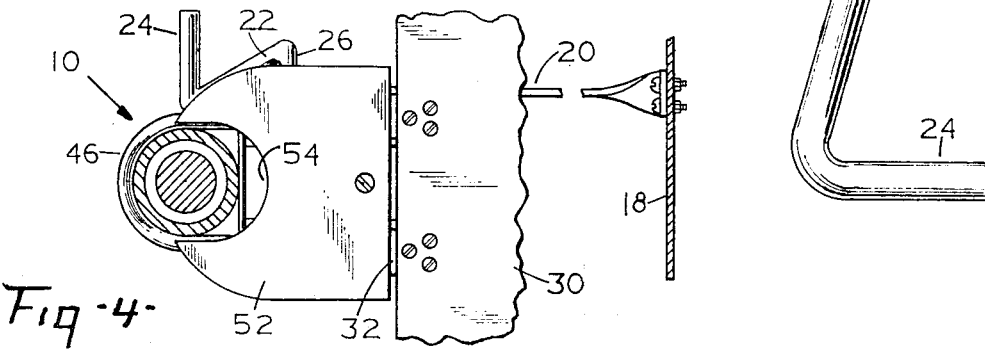
Fig-4-
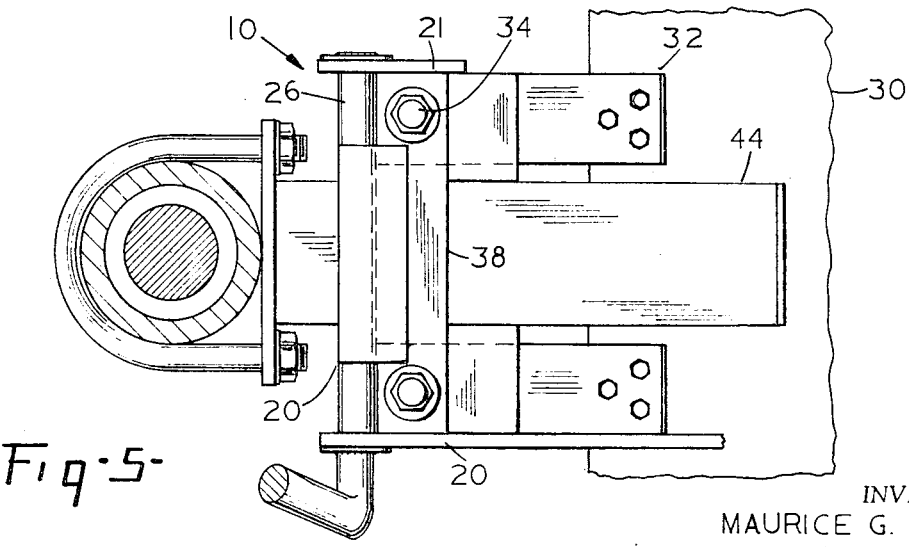
Fig-5-
INVENTOR:
MAURICE G. BURTON
BY Lawrence J. Monte,
Attorney

ADJUSTABLE TILT STEERING DEVICE

The present invention relates to an ajustable tilt steering device that can be used with motor homes, vehicles and the like.

It is an object of the present invention to provide a steering column that can readily be adjusted or tilted at various angles and requires no high precision parts or equipment and installation can readily be accomplished without requiring skilled labor.

It is another object of the present invention to provide an economical tiltable steering column that is readily adaptable for motor homes, and different size trucks, and the like.

It is another object of the present invention to provide a tiltable steering column which readily permits the steering column to be tilted to a substantially vertical position for ease in getting in and out of the driver's seat at one time, and for tilting it to the most desirable position that suits each individual driver when he is driving.

It is another object of the present invention to provide an adjustable steering column which can be adjusted while driving and when the vehicle is in motion.

It is yet another object of the present invention to provide a tiltable steering column that can readily be adjusted when the vehicle is in operation by merely pressing the foot pedal portion of the release crank and setting the steering column in the desired position.

Various other objects and advantages of the present invention will be readily apparent from the following detailed description when considered in connection with the accompanying drawings forming a part thereof, and in which:

FIG. 1 is a side elevational view illustrating the tiltable steering column embodied in the present invention.

FIG. 2 is a detailed fragmentary enlarged view of the tiltable steering column embodied in the present invention, taken along lines 2—2 of FIG. 3.

FIG. 3 is an enlarged detailed view taken along lines 3—3 of FIG. 1 looking rearwardly at the device embodied in the present invention.

FIG. 4 is an enlarged top plan view taken along the lines 4—4 of FIG. 1.

FIG. 5 is an enlarged bottom plan view taken along the lines 5—5 of FIG. 1.

Referring to the drawings, the reference numeral 10 generally designates the adjustable tilt steering column device of the present invention, which is provided with a conventional steering wheel 12 and is pivotally connected as indicated at 14 beneath the floor portion 16 of a motor home unit. The floor 16 extends forwardly and thereafter upwardly as indicated at 18, which forms a frame to which is secured two spaced brackets or braces 20 and 21 which extend in a direction parallel to the longitudinal axis of the vehicle or mobile unit. The rear ends of the brackets are provided with openings to receive the upper horizontally extending portion 26 of a release crank 22. The lower end of the release crank 22 is provided with a horizontally extending bar or foot pedal 24. The bracket 20 is secured to the frame 18, preferably by bolt members but it may be secured thereto in any desired manner. The horizontal portion 26 of the release crank is turnable or rotatable in the holes of the rackets.

A susbtantially flat rectangular release bar 28 is welded to the lower side of the horizontal crank portion 26 and extends transverse of the brackets 20 and 21 as best seen in FIGS. 2 and 3. It will be further noted that the release bar 28 has its major portion extending forwardly of the circumference of the horizontal crank portion 26.

A plate 30 is secured to the portion of the vehicle, not shown, above the frame 18 and has secured to its rear edge two spaced straps 32, which straps 32 are disposed in space relationship with the rear portions of the brackets 20 and 21, as best seen in FIG. 2. The straps 32 have bolt members 34 extending through holes in the rear portion thereof and the bolt members are threaded through an upper horizontally extending bar 36 and a lower horizontally extending gripping bar 38. The gripping bar 38 is also disposed between the brackets or braces 20 and 21, as best seen in FIG. 3. The bolt members 34 are provided with compression springs 40 on their lower ends and an adjustable nut 42 on the lower end thereof. The compression springs normally urge the gripping bar in an upward direction.

An arcuate tongue member having a U-bolt 46 secured to its rear edge and mounted around the steering column is disposed between the upper bar 36 and the lower gripping member 38. The tongue extends in a longitudinal direction parallel to the longitudinal axis of the vehicle, as best seen in FIGS. 2 and 3.

Two guide bars 48 are also mounted on the bolt members 34 and disposed on opposite sides of the tongue member 44.

The gripping bar 38 has its opposite ends welded to the braces 20 and 21 so that they are fixed thereon. The release bar 28 is disposed so that its front portion bears against two slidable pins 50 disposed in slots in the gripping bar 38. The upper end of the pins 50 bear against the guide bar 48.

A cover member 52 may be provided to fit over the device and has a cut-out 54 in the rear edge thereof to allow the steering column to be readily adjusted without interfering with the cover. The cover member may be secured to the straps 32 is desired.

In operation, when it is desired to tilt the steering column 10 of the present invention from one position to another the operator merely presses down on the bar 22 of the release crank and the release crank will move in a counter-clockwise direction, as indicated by the arrow in FIG. 2. The release plate 28 will be forced against the lower ends of the pins 50, but since the pins 50 are prevented from moving upwardly, the rear portion of the release bar moves downwardly and brings the rear portion of the braces or brackets 20 and 21 downwardly since the horizontal crank portion 22 extends through the brackets 20 and 21. At this time, the gripping bar 38, which is welded to the brackets 20 and 21, moves in a downwardly direction compressing the springs 40 so as to release the tongue 44 from pressure on its underside. The operator then pulls or pushes the steering wheel forwardly or rearwardly, as indicated by the dotted lines in FIG. 1, to the position he desires. The gripping bar moves downwardly against the compression springs and away from the tongue only a small fraction of an inch, but just enough to release the tongue for sliding between the gripping bar and the upper bar 36.

When pressure is released on the foot pedal bar 24, the springs cause the gripping bar 38 to move back upwardly and to bear against the lower side of the tongue 44 so as to again hold it in an immobile position.

Thus, from the foregoing description, it is apparent that the present invention provides a novel, simple and rugged tiltable steering column device for motor home steering column units and the like, which can be economically manufactured and installed by unskilled labor.

Inasmuch as various changes may be made in the relative arrangement, form and location of the parts without departing from the invention, it is not meant to limit the scope of the invention except by the appended claims.

What is claimed is:

1. An adjustable tiltable steering device including a steering column positioned for pivotal connection at its lower end to a vehicle, a movable tongue connected to said column and extending forwardly thereof, spaced brackets disposed on opposite sides of said tongue having a forward fixed end and a movable rear end, a gripping bar extending transversly between the rear ends of said brackets and fixed thereto, a release crank extending downwardly adjacent said column and having a transverse rotatable portion extending through holes in the rear ends of said brackets, a release plate fixed to said transverse crank portion below said gripping bar, spaced strap members disposed above said brackets, bolt members extending downwardly through holes in said straps, an upper bar mounted on said bolts, said bolts extending through holes in said gripping bar, springs disposed on said bolts and bearing against the lower side of said gripping bar, said tongue extending substantially perpendicular to said gripping and upper bar, slidable pins extending through said gripping bar and seated on said release plate, whereby said tongue is maintained locked between said upper and gripping bars until said transverse crank portion is rotated in a counter-clockwise direction to pull said gripping bar out of contact with said tongue to permit movement thereof.

2. The device of claim 1 wherein said crank includes an elongated vertical bar with a horizontal bar on its lower end for a foot pedal.

3. The device of claim 1 wherein guide bars are mounted on said bolts between said gripping and upper bars.

4. The device of claim 1 wherein a threaded nut is disposed on said bolts to provide adjustment of the force in said springs.

5. The device of claim 1 wherein said transverse crank is a rod and has said release plate welded to its lower circumference.

6. The device of claim 1 wherein said tongue is arcuate and is connected to said column by a U-bolt.

7. The device of claim 1 wherein said brackets have free rear ends.

8. The device of claim 1 wherein said bolts are vertically inclined with their lower ends being forward of the rear ends.

9. The device of claim 1 wherein a cover member is provided for the device.

* * * * *